Figure 1:
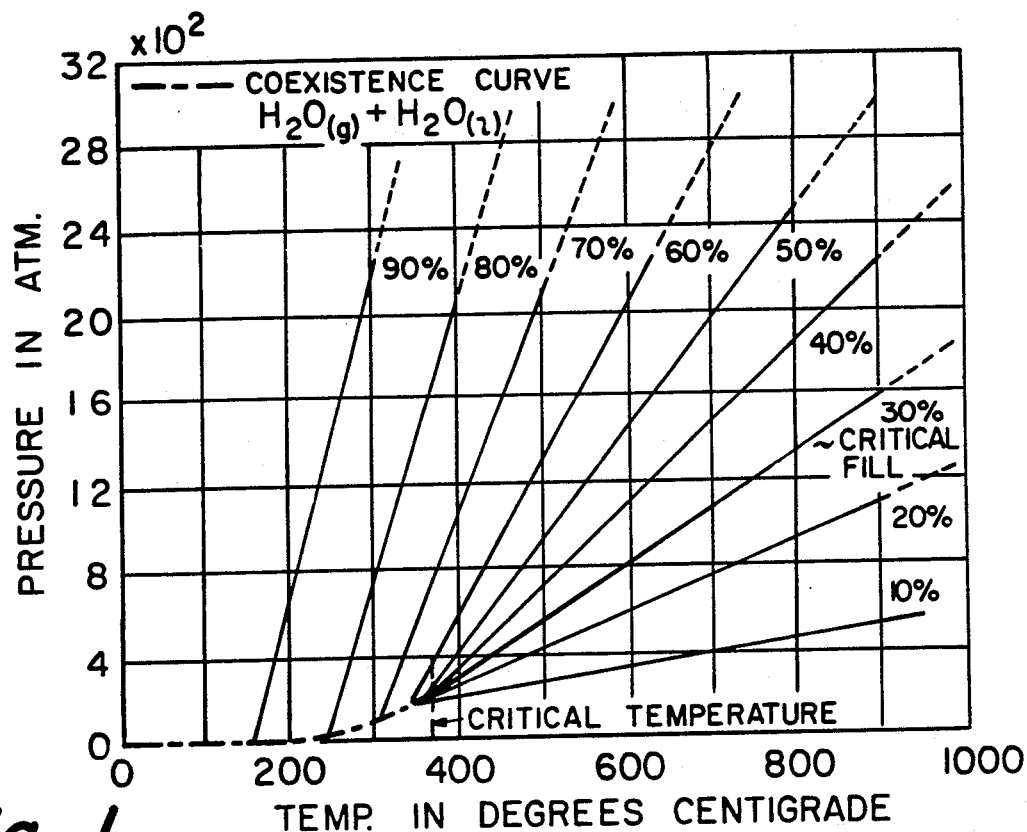

United States Patent [19]

Pierson et al.

[11] 4,201,561
[45] May 6, 1980

[54] METHOD FOR HYDRATING SILICATE GLASSES

[75] Inventors: Joseph E. Pierson; Walter H. Tarcza, both of Painted Post, N.Y.

[73] Assignee: Corning Glass Works, Corning, N.Y.

[21] Appl. No.: 822,877

[22] Filed: Aug. 8, 1977

Related U.S. Application Data

[63] Continuation-in-part of Ser. No. 445,454, Feb. 25, 1974, abandoned.

[51] Int. Cl.$^2$ ............................................. C03C 23/00
[52] U.S. Cl. ............................ 65/30 R; 106/74; 423/334
[58] Field of Search ............... 423/322, 334; 65/30 R, 65/32; 106/74

[56] References Cited

U.S. PATENT DOCUMENTS

| | | | |
|---|---|---|---|
| 1,763,845 | 6/1930 | Edgerton | 65/DIG. 14 |
| 2,251,515 | 8/1941 | Curll, Jr. | 423/332 X |
| 3,498,802 | 3/1970 | Bickford et al. | 65/30 R |
| 3,782,906 | 1/1974 | Pierce | 65/DIG. 14 |
| 3,868,227 | 2/1975 | Gericke et al. | 65/DIG. 14 |
| 3,912,481 | 10/1975 | Barthholomew et al. | 65/30 R |
| 4,059,425 | 11/1977 | Brydges et al. | 65/22 |

*Primary Examiner*—Robert L. Lindsay, Jr.
*Attorney, Agent, or Firm*—Clinton S. Janes, Jr.; Clarence R. Patty, Jr.

[57] ABSTRACT

The present invention is concerned with a single-step process for hydrating alkali metal-containing silicate glasses starting with such fine-dimensioned forms as powders, granules, flakes, fibers, and thin sheets. The process, which contemplates hydration temperatures higher than 225° C. and relative humidities less than 50%, permits the precise control of the quantity of water taken into the glass structure and, where the water content in the glass is held within about 1-25% by weight, the hydrated product of the above-cited powders, granules, etc., can be thermoplastically formed into sound bulk articles. A layer of the anhydrous powders can be applied to a substrate and then hydrated in situ to form glassy paints and coatings.

4 Claims, 2 Drawing Figures

METHOD FOR HYDRATING SILICATE GLASSES

This application is a continuation-in-part of Ser. No. 445,454, filed Feb. 25, 1974, now abandoned.

The hydration of alkali metal-containing silicate glass bodies utilizing treatment in steam at elevated temperatures and pressures has been described in the prior art. For example, U.S. Pat. No. 3,498,802 discusses the hydration of alkali silicate glass powders to yield thermoplastic materials and hydraulic cements. The glass powders consisted essentially, in mole percent on the oxide basis, of 80–94% $SiO_2$ and 6–20% $Na_2O$ and/or $K_2O$, the total of those constituents comprising at least 90 mole percent of the total composition. Various compatible metal oxides such as PbO, BaO, MgO, $B_2O_3$, $Al_2O_3$, and ZnO could, optionally, be included but CaO and $Li_2O$ were desirably avoided. The hydration process involved contacting the glass powders with a gaseous environment of at least 50% by weight water at a pressure of at least one atmosphere and a temperature commonly within the range of about 100°–200° C. This treatment in the $H_2O$-containing environment was continued for a period of time sufficient to produce at least a surface layer on the powders containing up to 30% by weight $H_2O$. Temperatures of 80°–120° C. were observed as causing the hydrated powders to become adhesive and cohesive thereby enabling forming thereof through such conventional methods as pressing, rolling, extrusion, and injection molding.

In U.S. application Ser. No. 445,453, now U.S. Pat. No. 3,912,481, filed concurrently with U.S. application Ser. No. 445,454, the predecessor of the instant application, the production of alkali silicate materials is disclosed which will exhibit forming characteristics and physical behavior approaching those demonstrated by high polymer organic plastics. The products discussed therein are described as displaying thermoplastic properties, by which is meant the ability of the material to flow sufficiently to allow shaping thereof utilizing methods well-recognized in the plastics art at temperatures below those at which conventional glasses commonly flow. Thus, as defined, thermoplastic materials can be formed at temperatures ranging from above the freezing point of water to about 500° C. The invention disclosed contemplates subjecting alkali silicate glass bodies of specified composition to a two-step process involving, first, a hydration treatment, and, second, a dehydration treatment.

In brief, the glass compositions described therein consist essentially, in mole percent, of 3–25% $Na_2O$ and/or $K_2O$ and 50–95% $SiO_2$, the sum of those components constituting at least 55 mole percent of the total composition. Various compatible metal oxides such as $Al_2O_3$, BaO, $B_2O_3$, CaO, MgO, PbO, CdO, and ZnO can be advantageously added to improve melting and forming of the glass or to modify the chemical and physical properties of the shaped glass. PbO, CaO, ZnO, and $B_2O_3$ can be useful in amounts up to 25%, MgO can be included in amounts up to about 35%, BaO and $Al_2O_3$ are operable at values up to 20%, but individual additions of the other optional oxides are preferably maintained below 10%. CaO frequently yields an opaque body which, obviously, would render it useless in applications where transparency is required. $Li_2O$ was found to inhibit hydration so was a less desirable addition, but could be tolerated in amounts up to about 5%.

The method of that invention comprises first contacting the glass at a temperature of at least 100° C. with a gaseous $H_2O$-containing environment wherein the $H_2O$ pressure is sufficiently high to achieve an essentially saturated atmosphere. This contact is maintained for a sufficient period of time to develop at least a surface portion in the glass which is saturated with water. The amount of water diffused within the glass is dependent upon the composition thereof. For example, those glasses containing relatively small amounts of $Na_2O$ and/or $K_2O$ will normally absorb no more than about 10% by weight of water and, in some instances, less than 5% by weight, whereas glasses containing substantial amounts of $Na_2O$ and/or $K_2O$ will generally absorb water in amounts exceeding 15% by weight and can range up to 35%. Following this hydration step, the water content introduced into the glass thereby is reduced through exposure to a gaseous environment of lower relative humidity. The dehydration step improves the chemical durability of the glass, increases the mechanical strength thereof, and inhibits the spontaneous dehydration phenomenon frequently observed in glasses containing high water contents. Although the glass body can be dehydrated to an essentially anhydrous state, such practice effectively eliminates the capability for displaying thermoplastic behavior. Therefore, the water content is customarily reduced to between about 1–12% by weight, depending upon the composition of the glass, the higher values reflecting those compositions absorbing more water during the initial hydration step.

In general, the hydration step described therein is conducted in an atmosphere of 100% relative humidity to expedite the diffusion of water within the glass and the dehydration is conducted at low relative humidities to promote the rapid removal of water. The two-step process enables glass articles of substantial mass having controlled very low water contents to be secured in relatively short periods of time.

However, a serious problem encountered in carrying out the two-step practice of that invention was the incidence of cracking, foaming, spalling, and/or deformation of bulk bodies during the dehydration step. Thus, extreme control of temperature, pressure, and relative humidity was required to achieve sound bodies.

Therefore, the primary objective of the instant invention is to provide a method for hydrating such fine-dimensioned bodies as beads, granules, powders, ribbon, etc., of alkali metal-containing silicate glasses wherein the water content absorbed therein can be carefully controlled and the amount of such water will be effective to impart thermoplastic properties thereto.

We have discovered that this objective can be achieved in a single-step hydration procedure applied to glass compositions generally found suitable in the above-described two-step, hydration-dehydration process. The glass compositions operable in this process consist essentially, in mole percent on the oxide basis, of 3–25% $Na_2O$ and/or $K_2O$ and 50–95% $SiO_2$, the sum of those constituents comprising at least 55 mole percent of the total composition. Additions advantageously included to improve melting and forming of the glass and/or to modify the chemical and physical properties thereof include such metal oxides as $Al_2O_3$, BaO, CdO, $B_2O_3$, CaO, MgO, PbO, $ZrO_2$, $WO_3$, $MoO_3$, $TiO_2$, SrO, and ZnO. With the exception of PbO, CaO, ZnO, and $B_2O_3$ which can demonstrate utility up to about 25%, MgO which is operable up to about 35%, and BaO and $Al_2O_3$ which can advantageously be present in amounts up to about 15%, individual additions of other optional metal oxides will preferably be held below about 10%. The presence of CaO will frequently result in an opaque body which, obviously, would limit its utility to those applications where transparency is not required. $Li_2O$ appears to inhibit hydration so ought not to be included, if at all, in amounts greater than 5%. The well-recognized glass colorants such as CdS-Se, $Co_2O_3$, $Cr_2O_3$, CuO, $Fe_2O_3$, and NiO may be incorporated into the glass composition in the customary amounts up to a few percent. It should be recognized that these latter ingredients can be tolerated in amounts up to about 10% where their function is not limited to their effect as a colorant. Finally, where necessary, conventional fining agents can be included in customary amounts.

The single step procedure of the instant invention contemplates contacting fine-dimensioned bodies of such compositions at temperatures in excess of 225° C. with a $H_2O$-containing gaseous environment having a relative humidity less than 50%.

U.S. Pat. No. 3,498,802, supra, specifically notes the use of environments of high water contents at temperatures ranging up to 200° C., with the comment that the quality of the rubbery product developed at temperatures above 200° C. was not significantly better than that obtained at lower temperatures and, furthermore, that in certain instances the product was not sound.

Another factor of substantive importance which is inherent where the hydration process is conducted in saturated or near-saturated environments is the inability to control the amount of water absorbed into the glass structure. Thus, the amount of water which penetrates into the glass is constant with time, it does not vary linearly with temperature and pressure. The amount of water absorbed is predominantly a function of glass composition. In some instances a minor temperature effect has been observed which is, however, too small to alter the water content in the glass to any appreciable extent. Thus, the change has been about 1.5% by weight water. As a consequence, there is obviously very little flexibility in the choice of anhydrous glasses which can be hydrated to yield products of useful thermoplasticity coupled with desirable other physical characteristics. We have discovered that such flexibility can be enjoyed where the hydration process is carried out in environments of low relative humidity, viz, less than 50% relative humidity, and at temperatures considerably in excess of 200° C., viz, higher than 225° C.

The instant invention, therefore, enables the hydration of fine-dimensioned glass bodies of widely-varying compositions to be undertaken in a manner to obtain levels of absorbed water which can be carefully controlled. Furthermore, the method permits water contents up to about 25% by weight to be obtained within the glass that are adequate to impart thermoplastic properties thereto, but which do not give rise to the foaming and cracking phenomena frequently encountered during the dehydration step of the two-step practice described above in U.S. Pat. No. 3,912,481.

Also, the amount of water absorbed can be readily controlled and maintained at a sufficiently low value to assure good chemical durability in the hydrated body in those compositions where the anhydrous glass exhibits inherent good durability.

It can be recognized that the expression relative humidity is limited in its description of a water-containing atmosphere at very high temperatures. This situation is founded in the fact that the definition of relative humidity necessarily contemplates a level of saturated vapor pressure. Thus, there is a maximum temperature at which any gas can be liquefied, this temperature being defined as the critical temperature. Concomitantly, there is a critical pressure, i.e., the pressure demanded to liquefy a gas at the critical temperature. For water, the critical temperature is about 374° C. and the critical pressure is about 3200 psi. Above the critical temperature $H_2O$ has been defined as a fluid which is not considered to be either a liquid or a gas.

Figure 2:
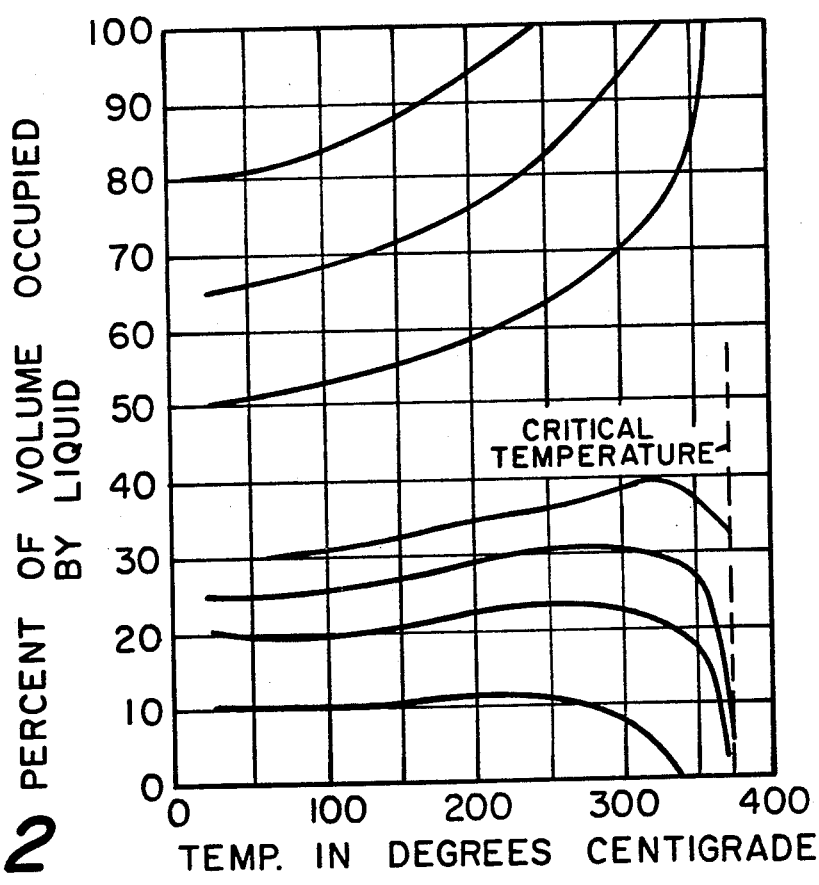

This situation is exemplified in FIG. 1 taken from page 180 of "Hydrothermal Crystal Growth," R. A. Laudise and J. W. Neilsen, *Solid State Physics*, 12, pp. 149-222, Academic Press, New York, 1961, which sets forth pressure-temperature curves for $H_2O$ at constant volume. The straight lines in the drawing depict various filling factors, i.e., the percentage of the volume of the autoclave or other pressure vessel which is filled with liquid $H_2O$ at ambient temperature. The minimum filling factor, i.e., the minimum amount of liquid $H_2O$ which will produce a saturated steam atmosphere (100% relative humidity), can be calculated from standard steam tables. As is pointed out in FIG. 1, this critical filling factor for 374° C. is about 30%. FIG. 1 also illustrates that, with filling factors greater than about 30%, the liquid $H_2O$ expands to such an extent that the vessel is filled therewith at temperatures below the critical point, viz, 374° C., such that the vessel is subjected to hydrostatic pressure. This phenomenon is demonstrated in FIG. 2 taken from page 181 of the above-noted literature citation. The curves therein were drawn from the density data of $H_2O$ liquid and gas phases up to the critical temperature and reflect the height of the meniscus in a pressure vessel as a function of temperature at representative fills.

A study of FIG. 1 points out the fact that the pressure-temperature curves at constant fill are substantially linear beyond the coexistence curve (the temperature and pressure limits at which liquid and gaseous $H_2O$ can exist together) and can probably be safely extrapolated. And, inasmuch as the instant invention contemplates treating glass bodies in a gaseous $H_2O$ environment, it is believed apparent that a person of ordinary skill in the art, with FIG. 1 and the standard steam tables before him, could readily determine the necessary filling factor to achieve a desired saturated or less than saturated steam atmosphere at temperatures below 374° C. and, at temperatures above 374° C., could choose a filling factor to achieve any desired pressure at a particular temperature. Since the pressure-temperature curves at constant fill are virtually linear beyond the coexistence curve, one can essentially extrapolate the behavior of the environment from that of an environment of a certain relative humidity below the critical temperature.

Further treatment of critical temperature, filling factor, etc. can be found in such texts as *Steam Tables—Thermodynamic Properties of Water Including Vapor, Liquid, and Solid Phases (English Units)*, J. H. Keenan, F. G. Keyes, P. G. Hill, and J. G. Moore, John Wiley & Sons, New York, 1969, and *Thermodynamic Properties of Steam, Including Data for the Liquid and Solid Phases*, J. H. Keenan and F. G. Keyes. Reference is made to those studies for further explanation of these phenomena.

Table I reports a group of glass compositions, expressed in mole percent on the oxide basis, operable in the instant invention. The batches therefor can be compounded from any materials, either the oxides or other compounds, which, when fused together, will be converted to the desired oxide composition in the proper proportions. The batch components were carefully mixed together, normally in a ball mill to aid in obtaining a homogeneous melt, and then melted in open platinum or silica crucibles for about 16 hours at 1450°-1600° C. Larger melts, of course, can be made in pots or continuous melting tanks in accordance with conventional commercial glassmaking practice. Subsequently, the melts were cooled and shaped into glass bodies. Frequently, small particles of glass were made by passing a stream of molten glass through a hot flame, through an air blast, or into water. Where desired, thin ribbon can be drawn which can be hydrated in that form or broken into flakes. In general, a thickness dimension of 15 mm. has been deemed a practical maximum, with less than 5 mm. being preferred for speed in securing complete hydration.

ciated that a utility can be had in achieving a surface layer only which is hydrated.

In the following description, a commercially-available autoclave was employed having a chamber of one cubic foot. Steam pressure was generated by heating distilled water placed in the bottom of the vessel. The pressure was regulated by controlling the temperature. The desired humidity therein was achieved by predetermining the amount of water needed for that humidity at a particular temperature. Hence, the autoclave can be calibrated at any temperature as to the quantity of water required to yield a specific humidity. To insure reproducibility of results, the autoclave was completely dried before using. With small amounts of glass, such as were used in the trials reported here, the water taken up thereby during hydration is not sufficient to cause a loss in pressure. In the following illustrative examples, filling factors of about 10% and less were generally employed.

TABLE I

|  | 1 | 2 | 3 | 4 | 5 | 6 | 7 | 8 | 9 |
|---|---|---|---|---|---|---|---|---|---|
| $SiO_2$ | 76.9% | 75.3% | 78.4% | 71.6% | 73.2% | 77.2% | 75.8% | 79.0% | 76.4% |
| $Na_2O$ | 16.5 | 17.2 | 15.0 | 19.4 | 18.9 | 14.5 | 14.7 | 13.9 | 5.2 |
| $Al_2O_3$ | 2.1 | 1.3 | 1.7 | 1.2 | — | — | — | — | 0.8 |
| MgO | 4.5 | — | — | — | — | — | — | — | — |
| ZnO | — | 5.4 | 5.0 | 7.0 | — | — | — | — | — |
| BaO | — | 0.8 | — | 0.8 | — | — | — | — | — |
| PbO | — | — | — | — | 7.9 | 8.3 | 10.5 | 8.1 | 10.8 |
| $K_2O$ | — | — | — | — | — | — | — | — | 6.8 |

|  | 10 | 11 | 12 | 13 | 14 | 15 | 16 | 17 | 18 |
|---|---|---|---|---|---|---|---|---|---|
| $SiO_2$ | 71.2% | 71.2% | 70.8% | 77.2% | 68.3% | 79.1% | 72.2% | 76.6% | 70.0% |
| $Na_2O$ | 3.7 | 2.9 | 7.1 | 4.4 | 5.2 | 15.4 | 15.7 | 8.9 | 15.0 |
| $K_2O$ | 5.9 | 6.6 | 3.7 | 6.7 | 5.3 | — | 0.3 | 5.6 | — |
| $Al_2O_3$ | 0.5 | — | 1.7 | 1.5 | 1.8 | 0.7 | 0.8 | 1.3 | — |
| PbO | 18.7 | 18.0 | 16.7 | 10.2 | 19.4 | 4.7 | — | 7.4 | 1.5 |
| $B_2O_3$ | — | 1.3 | — | — | — | 4.6 | 0.9 | — | — |
| $As_2O_3$ | — | — | — | — | — | 0.1 | — | 0.2 | — |
| CaO | — | — | — | — | — | — | 5.1 | — | — |
| MgO | — | — | — | — | — | — | 5.0 | — | — |

The hydration step has been carried out in an autoclave since control of steam pressure, relative humidity, and temperature can readily be had in such an apparatus. The thin glass sheet ribbon was point supported above the base plate of the autoclave on refractory or TEFLON® or other non-adhering and non-reactive material horizontally supported above the floor of the autoclave. The autoclave is sealed and heated to generate steam at a desired pressure. In general, steady state operation of the autoclave was reached in about one-half hour, although at the highest temperatures employed a somewhat longer period of time was frequently required.

The length of time needed to achieve hydration throughout the glass or to a desired depth therein is directly related to the composition of the glass and the $H_2O$ pressure and temperature utilized in the hydration process. Thus, it is generally true that glasses wherein the alkali metal contents are greater will hydrate more rapidly and to higher water concentrations so long as the ratios of the remaining glass constituents do not change. Such glasses, will, in the main, be less chemically durable. Higher treatment temperatures and $H_2O$ pressures will also normally result in more rapid hydration. Also, of course, the time for complete reaction is inversely proportional to the smallest cross section of the anhydrous glass body employed. Finally, whereas the preferred embodiment of the invention involves hydrating the glass completely through, it can be appreciated For ease in subsequent forming operations utilizing apparatus conventional in shaping organic plastic bodies and/or to achieve substantial hydration in not unreasonably long times, particles varying in size from a No. 4 U.S. Standard Sieve (4.76 mm.) to a No. 400 U.S. Standard Sieve (37 microns) have been commonly used. Obviously, for the very fine particles, only a relatively short treatment time, e.g., 2-4 hours, in the autoclave will be required at any particular temperature, whereas longer exposure time, e.g., 24-72 hours or longer, will be demanded with the larger particles. After a treatment, the autoclave is normally permitted to cool to at least below 100° C. at its own rate before the samples are removed. However, removal at elevated temperatures is feasible after water has been drained out of the autoclave. The water content taken up by the glass is determined by comparing the weight of the glass before and after the hydration step.

Where the particles are to be formed into a bulk body, it is generally to be preferred that hydration has proceeded completely therethrough. Frequently, the glass particles will flow during the hydration process to form a solid body.

Table II reports a comparison of the water contents in weight percent absorbed by several of the glasses of Table I, utilizing particles passing a No. 18 U.S. Standard Sieve (1 mm.), wherein an autoclave operating for 16 hours at a temperature of 300° C. and at various relative humidities up to 100% was employed. It can be observed that control of the water content absorbed by the glass can be had where relative humidities less than 50% are employed. In contrast, at higher relative humidities, the amount of water absorbed is essentially a constant value. This capability of close control over water content enables the final product to be tailored for a particular application.

It is this close control of water content which distinguishes the method of the present invention from that disclosed in U.S. Pat. No. 3,498,802. Thus, the instant invention is founded in the combination of low relative humidity with high treatment temperatures, viz, relative humidities below 50% and temperatures in excess of 225° C.

TABLE II

| | Relative Humidities and Steam Pressures | | | | | | | | | |
|---|---|---|---|---|---|---|---|---|---|---|
| Example No. | 17.5% (218 psi) | 21.3% (265 psi) | 26.1% (325 psi) | 32.1% (400 psi) | 34.9% (434 psi) | 39% (485 psi) | 42.6% (530 psi) | 43.4% (540 psi) | 48.6% (605 psi) | 100% (1246 psi) |
| 1 | — | — | — | — | — | 12.0 | — | — | — | 26 |
| 2 | — | 4.9 | 7.0 | 8.6 | — | 11.0 | 13.5 | — | — | 24 |
| 3 | — | — | 6.3 | 7.6 | 8.8 | 10.5 | 10.6 | — | — | 18 |
| 4 | — | 6.5 | — | 8.4 | — | — | — | — | — | 22 |
| 5 | — | — | — | — | — | 9.0 | — | — | — | 19 |
| 6 | 2.5 | 3.1 | 4.7 | 7.0 | — | 7.0 | — | — | — | 13 |
| 7 | — | — | — | — | — | 6.0 | — | — | — | 14 |
| 8 | — | — | — | — | — | 8.0 | — | — | — | 13 |
| 9 | 2.8 | — | 4.6 | — | — | 5.9 | 6.5 | — | — | 13 |
| 10 | — | — | — | — | — | — | — | 3.2 | 4.0 | 7 |
| 11 | — | — | — | — | — | — | — | 3.2 | 3.0 | 7 |
| 12 | — | — | — | — | — | — | — | 3.2 | 3.7 | 6 |
| 13 | — | — | 5.6 | — | — | — | 5.3 | — | — | 10 |
| 14 | — | — | — | — | — | — | — | 3.3 | — | 5.5 |
| 15 | — | — | — | 8.0 | — | — | — | 9.4 | 11.5 | 17 |
| 16 | — | — | — | — | — | — | — | — | — | 25 |
| 17 | — | — | — | — | — | 4.5 | 5.6 | — | — | 13 |

Table III sets forth a comparison of the water contents absorbed by glasses of Table I after hydrating particles passing a No. 18 U.S. Standard Sieve in an autoclave operating for 16 hours at a temperature of 350° C. at various relative humidities.

TABLE III

| | Relative Humidities and Steam Pressures | | | | |
|---|---|---|---|---|---|
| Example No. | 17.5% (420 psi) | 20.6% (495 psi) | 25.9% (622 psi) | 30.9% (740 psi) | 37.1% (890 psi) |
| 2 | — | 7.8 | — | 9.6 | 8.3 |
| 3 | 4.5 | 5.8 | 6.4 | 8.5 | 9.4 |
| 9 | 3.3 | 4.6 | 5.0 | — | 6.1 |
| 10 | — | — | — | — | 3.0 |
| 11 | — | — | — | 2.2 | 3.9 |
| 12 | — | — | — | 2.2 | 2.4 |
| 13 | 2.7 | 2.8 | 3.6 | — | 4.4 |
| 15 | — | 2.2 | — | — | 6.9 |
| 17 | 3.2 | 7.0 | — | — | — |

Table IV records a comparison of the water content absorbed by glasses of Table I after treating particles passing a No. 18 U.S. Standard Sieve in an autoclave operating for 16 hours at a temperature of about 374° C. at various relative humidities.

TABLE IV

| | Relative Humidities and Steam Pressures | | | |
|---|---|---|---|---|
| Example No. | 16.6% (530 psi) | 19.7% (630 psi) | 24.1% (770 psi) | 27.5% (880 psi) |
| 3 | — | 5.9 | — | — |
| 9 | 2.2 | 3.4 | 4.0 | 4.5 |
| 10 | — | 0.8 | — | 1.3 |
| 11 | — | 1.4 | 2.3 | 2.7 |
| 12 | 1.0 | 1.4 | 1.4 | 2.8 |
| 13 | 2.1 | 2.4 | 2.8 | 3.5 |
| 15 | — | — | 9.0 | — |
| 17 | 2.4 | — | 4.3 | 5.0 |

The effect of the amount of water absorbed in the glass upon the chemical durability thereof is clearly exhibited in Table V below. Where the absorbed water content exceeds about 15% by weight, the durability of the body is seriously impaired. As a general statement, the lower the absorbed water content, the better the chemical durability. Conversely, as a general premise, the lower the absorbed water content, the less thermoplasticity exhibited by the body. Nevertheless, certain compositions, e.g., those glasses containing a large amount of PbO such as Examples 9-14 supra, will demonstrate sufficient thermoplasticity to be shaped utilizing low temperature forming techniques conventional in the plastics art where they contain as little as about 1% absorbed water. In view of these factors, therefore, the preferred bodies will contain about 1-12% by weight water.

Table V reports the results observed and measured after the exposure of discs pressed from hydrated glass powders to distilled water at a temperature of 70° C. for 20 hours. A weight loss of less than about 100 micrograms/cm$^2$ has been deemed indicative of satisfactory chemical durability for the majority of general applications.

In pressing the discs, the hydrated glasses were sized to pass a No. 200 U.S. Standard Sieve (74 microns). The particles were placed into a 1¼" diameter mold, the mold heated to soften the glass, and then a plunger applied at a load of about 5000–8000 psi to shape the particles into discs about ⅛"–174 " thick.

TABLE V

| Example No. | Particle size | Autoclave treatment | | | (Extracted (μ/cm$^2$)) | | | Water absorbed |
|---|---|---|---|---|---|---|---|---|
| | | | | | Na$_2$O | K$_2$O | PbO | |
| 1 | −18 + 32 mesh | 350° C., | 16 hours | 30.9% R.H. | 11,168 | — | — | 12.5% |
| 1 | −32 + 80 mesh | 374° C., | 16 hours | 19.7% R.H. | 5,264 | — | — | 9.6% |

TABLE V-continued

| Example No. | Particle size | Autoclave treatment | | | Extracted (μ/cm²) | | | Water absorbed |
|---|---|---|---|---|---|---|---|---|
| | | | | | Na₂O | K₂O | PbO | |
| 3 | −32 + 80 mesh | 350° C., | 16 hours | 30.9% R.H. | 84 | — | — | 8.5% |
| 9 | −32 + 80 mesh | 374° C., | 16 hours | 19.7% R.H. | 9.4 | 8.9 | 0.8 | 3.4% |
| 9 | −32 + 80 mesh | 350° C., | 16 hours | 30.9% R.H. | 21 | 34 | 0.2 | — |
| 10 | −80 + 140 mesh | 350° C., | 16 hours | 30.9% R.H. | 7.9 | 1.9 | 0.4 | — |
| 10 | −140 + 200 mesh | 374° C., | 16 hours | 19.7% R.H. | 8.4 | 1.2 | 0.03 | 0.8% |
| 11 | −80 + 140 mesh | 350° C., | 16 hours | 30.9% R.H. | 8.0 | 3.0 | 0.3 | 2.2% |
| 11 | −140 + 200 mesh | 374° C., | 16 hours | 19.7% R.H. | 7.9 | 2.8 | <0.01 | 1.4% |
| 12 | −140 + 200 mesh | 374° C., | 16 hours | 19.7% R.H. | 9.9 | 1.9 | 0.2 | 1.4% |
| 13 | −80 + 140 mesh | 374° C., | 16 hours | 19.7% R.H. | 8.5 | 3.6 | <0.01 | 2.4% |
| 17 | −32 + 80 mesh | 374° C., | 16 hours | 19.7% R.H. | 10 | 9.3 | 0.3 | — |

A practical minimum operable relative humidity with the treating environment has been determined to range about 5%. However, as has been observed above, the greater the H₂O pressure and the higher the temperature within the treating environment the more rapid the process of hydration. Hence, with environments exhibiting very low relative humidities, e.g., 5–10%, very high temperatures will commonly be required to promote hydration at a reasonably practical rate. In light of this factor, temperatures in excess of 300° C. and, preferably, in excess of 350° C. will generally be required where the H₂O pressure employed is very low. In any event, a temperature of at least 225° C. and, more preferably, higher than 250° C. will be utilized for the subject compositions.

The maximum hydrating temperature is, in actuality, governed by the capability of the equipment employed, assuming that softening and/or melting of the fine-dimensioned material is not deleterious to the purpose envisioned therefor. Hence, temperatures of 500°–600° C. are mechanically feasible. However, hydration will normally, but not necessarily, be undertaken at a temperature below the softening point of the anhydrous glass.

Bulk shapes can be produced from the hydrated particles employing forming methods conventional in the organic plastics art. Thus, the thermoplastic behavior of the materials permits them to be dry pressed, injection molded, or extruded in like manner to organic polymers. Each forming operation commonly contemplates the mass being shaped under pressure and, although it is sometimes possible for shapes to be formed at about room temperature, elevated temperatures, e.g., about 100°–400° C., are utilized where better flow in the hydrated material can be obtained. A practical maximum temperature of about 500° C. has been determined for the glass compositions of this invention.

Since some volatilization of the absorbed water can take place at the forming temperatures utilized, shaping of the articles within an autoclave or other pressurized system may be warranted. Various atmospheres may also be employed at suitable pressure to inhibit excessive volatilization of water.

Table VII contrasts the products resulting from bodies of high and low water contents. Particles passing a No. 140 U.S. Standard Sieve (105 microns) of anhydrous glass of each example were hydrated for four hours at 270° C. The hydration resulted in the softening and coalescing together of the particles into a patty. The patty was broken into variously-sized pieces and these pieces placed into a 1¼" diameter mold which preferably had been preheated and a slight pressure (10–50 psi) applied. The unit was thereafter heated and at about 270°–300° C. the glass began to soften. Thereupon, a load of between about 5000–8000 psi was applied to the mold. After about three minutes, the heat was removed and the mold allowed to cool below 60° C. The load was then released and a disc (⅛"–¼" in thickness) taken from the mold.

TABLE VII

| Example No. | 100% Relative Humidity | | 38% Relative Humidity | |
|---|---|---|---|---|
| | Weight of Water | Appearance | Weight of Water | Appearance |
| 1 | 24 | Clear, rapid cracking | 10 | Clear, no cracking |
| 2 | 24 | Clear, rapid cracking | 9 | Clear, no cracking |
| 3 | 18 | Clear, rapid cracking | 6 | Slight haze, no cracking |
| 4 | 22 | Clear, rapid cracking | 10 | Clear, no cracking |
| 6 | 13 | Nearly clear, cracking | 6 | Slight haze, no cracking |
| 9 | 12 | Translucent, rapid cracking | 6 | Slight haze, no cracking |

The haze appearing in examples 3, 6, and 9, utilizing the 38% relative humidity treatment, could be eliminated through a more carefully controlled hydration procedure. The cracking phenomenon is commonly observed in bodies hydrated in saturated and near-saturated atmospheres and is essentially unavoidable even where extraordinary care is taken in drying the body after the forming step. This circumstance is another factor illustrating the substantive advantage of the instant inventive method in utilizing hydration atmospheres of low relative humidity.

Two other advantages inherent in the single-step inventive method have been observed. First, a clear surface is more readily obtainable in environments of reduced humidity because surface leaching due to re-condensation can be readily avoided. Second, and of significant practical advantage, the use of lower steam pressures in the hydration process reduces the bulk needed in the autoclave equipment to withstand high pressures, thereby decreasing the cost of the autoclaving apparatus.

We have found these materials to be very useful as paints or coatings on various substrates which do not react with the materials in a deleterious manner. Very hard, durable coverings can be secured by comminuting the glass to a fine powder, e.g., passing through a No. 400 U.S. Standard Sieve, and, optionally, mixing the powder with a liquid vehicle such as water or methanol to produce a thick slurry. The dry powder or slurry is applied to a desired substrate, such, for example, as a steel or aluminum plate, a glass slide, or a ceramic article, and the coated object treated in an autoclave. The hydration practice employed will be the same as that recited above for the glass bodies, themselves, and will be dependent upon the alkali metal oxide content of the covering material.

Examples 1, 3, and 13, after treatment at 49% relative humidity for 16 hours at 250° C., flowed into clear, hard, well-adhered, glassy coatings.

Although in the above working examples air comprises that part of the atmosphere other than steam, it will be appreciated that various inert gases such as helium, argon, and nitrogen can be introduced.

We claim:

1. A single step method for making a glass body exhibiting thermoplastic properties which comprises subjecting an anhydrous glass body having a thickness dimension no greater than 15 mm. consisting essentially, in mole percent on the oxide basis, of about 3–25% $Na_2O$ and/or $K_2O$ and 50–95% $SiO_2$, the sum of those components constituting at least 55% of the total composition, to a $H_2O$-containing gaseous environment having a relative humidity of at least 5%, but less than 50%, at a temperature in excess of 225° C. for a period of time sufficient to develop at least a surface portion having about 1–12% by weight of water absorbed therein effective to impart thermoplastic properties and good chemical properties thereto which does not give rise to foaming and cracking.

2. A method according to claim 1 wherein said temperature ranges up to about the softening point of the anhydrous glass.

3. A method according to claim 1 wherein said temperature ranges up to about 600° C.

4. A method according to claim 1 wherein said period of time ranges between about 2–72 hours.

* * * * *